US010436218B2

United States Patent
Ozaki et al.

(10) Patent No.: US 10,436,218 B2
(45) Date of Patent: Oct. 8, 2019

(54) COMPRESSOR COVER, CENTRIFUGAL COMPRESSOR, AND TURBOCHARGER, AND COMPRESSOR COVER MANUFACTURING METHOD

(71) Applicant: MITSUBISHI HEAVY INDUSTRIES ENGINE & TURBOCHARGER, LTD., Sagamihara-shi, Kanagawa (JP)

(72) Inventors: Makoto Ozaki, Tokyo (JP); Hiroshi Suzuki, Tokyo (JP); Koji Wakashima, Tokyo (JP); Isao Tomita, Tokyo (JP); Tadashi Kanzaka, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 381 days.

(21) Appl. No.: 15/314,379

(22) PCT Filed: Jul. 3, 2014

(86) PCT No.: PCT/JP2014/067756
§ 371 (c)(1),
(2) Date: Nov. 28, 2016

(87) PCT Pub. No.: WO2016/002037
PCT Pub. Date: Jan. 7, 2016

(65) Prior Publication Data
US 2017/0191502 A1 Jul. 6, 2017

(51) Int. Cl.
*F04D 17/10* (2006.01)
*F04D 29/42* (2006.01)
(Continued)

(52) U.S. Cl.
CPC ......... *F04D 29/4213* (2013.01); *F04D 17/10* (2013.01); *F04D 29/624* (2013.01);
(Continued)

(58) Field of Classification Search
CPC .... F04D 27/02; F04D 27/0207; F04D 27/009; F04D 29/4213
See application file for complete search history.

(56) References Cited

U.S. PATENT DOCUMENTS

| 4,743,161 A | 5/1988 | Fisher et al. |
| 5,333,990 A | 8/1994 | Foerster et al. |

(Continued)

FOREIGN PATENT DOCUMENTS

| CN | 1070721 A | 4/1993 |
| CN | 102428282 A | 4/2012 |

(Continued)

OTHER PUBLICATIONS

International Search Report and Written Opinion of the International Searching Authority (Forms PCT/ISA/237 and PCT/ISA/210), dated Sep. 30, 2014, for International Application No. PCT/JP2014/067756, with an English translation.

*Primary Examiner* — Richard A Edgar
(74) *Attorney, Agent, or Firm* — Birch, Stewart, Kolasch & Birch, LLP

(57) ABSTRACT

A compressor cover covering a delivery fan radially outwardly discharging a fluid from an axial direction by rotating around the axis, the compressor cover comprising: a cover body including a tubular part in which a tubular inner peripheral surface along the axis and a shroud surface disposed on an axially downstream side of the tubular inner peripheral surface and expands in diameter toward the downstream side are formed; and a sleeve including an outer tube having an outer peripheral surface fitted to the tubular inner peripheral surface, an inner tube disposed on a radially inner side of the outer tube and defines a recirculation flow path in which a portion of the fluid circulates between the
(Continued)

inner tube and the outer tube, and a plurality of struts disposed at intervals in the peripheral direction.

14 Claims, 8 Drawing Sheets

(51) Int. Cl.
*F04D 29/62* (2006.01)
*F04D 29/68* (2006.01)
*F04D 29/66* (2006.01)
*F04D 29/44* (2006.01)
*F04D 27/02* (2006.01)
*F02B 33/40* (2006.01)
*F02B 37/00* (2006.01)

(52) U.S. Cl.
CPC ............ *F04D 29/685* (2013.01); *F02B 33/40* (2013.01); *F02B 37/00* (2013.01); *F05D 2220/40* (2013.01); *Y02T 10/144* (2013.01)

(56) References Cited

U.S. PATENT DOCUMENTS

| | | | |
|---|---|---|---|
| 6,196,789 B1 * | 3/2001 | McEwen | F04D 27/0215 |
| | | | 415/119 |
| 6,945,748 B2 | 9/2005 | Svihla et al. | |
| 8,690,524 B2 * | 4/2014 | Yin | F04D 29/4213 |
| | | | 415/119 |
| 2012/0121400 A1 | 5/2012 | Tomita et al. | |
| 2012/0260652 A1 * | 10/2012 | Hiry | F04D 29/4213 |
| | | | 60/605.1 |

FOREIGN PATENT DOCUMENTS

| | | | |
|---|---|---|---|
| GB | 2 202 585 A | | 9/1988 |
| JP | 62-178799 A | | 8/1987 |
| JP | 03078524 A | * | 4/1991 |
| JP | 2003-106299 A | | 4/2003 |
| JP | 2009-138612 A | | 6/2009 |
| JP | 2011-85095 A | | 4/2011 |
| JP | 5039673 B2 | | 10/2012 |
| JP | 2013-60878 A | | 4/2013 |
| JP | 2013-224584 A | | 10/2013 |
| WO | WO 2009/077748 A1 | | 6/2009 |

\* cited by examiner

COMPRESSOR COVER, CENTRIFUGAL COMPRESSOR, AND TURBOCHARGER, AND COMPRESSOR COVER MANUFACTURING METHOD

TECHNICAL FIELD

The present invention relates to a compressor cover, a centrifugal compressor, and a turbocharger, and a compressor cover manufacturing method.

BACKGROUND ART

While global efforts for environmental protection of the Earth progress, strengthening of regulations regarding flue gas or fuel efficiency in internal combustion engines, such as engines of automobiles is continuing. Since turbochargers can reduce engine emissions compared to natural aspiration by sending compressed air into an engine, turbochargers are devices that are very effective in fuel efficiency improvement and $CO_2$ reduction.

In turbochargers, a turbine is rotationally driven by engine flue gas, thereby rotating a delivery fan of a coaxial centrifugal compressor. The air compressed by the rotation of the delivery fan is raised in pressure by being reduced in speed by a diffuser, and is supplied to the engine through a scroll flow path. In addition, regarding methods for driving turbochargers, not only driving using flue gas, but also various forms, such as driving using an electric motor and driving a prime mover via a transmission, are known.

If flow rate decreases in the centrifugal compressor used for such a turbocharger, surging that is the pulsation of the whole system occurs. In order to expand the operating range of a centrifugal compressor, it is necessary to reduce a critical flow rate at which surging occurs.

In contrast, PTL 1 discloses a technique of forming a recirculation flow path that allows a portion of the air sucked into a delivery fan to circulate therethrough, thereby expanding the operating range. This recirculation flow path is formed in a compressor cover that covers the delivery fan. This recirculation flow path is formed when an inner tube member having fins disposed at intervals in a peripheral direction is externally fitted to a compressor cover body in an axial direction. In this case, when outer peripheral ends of the fins abut against the compressor cover from the inside, the recirculation flow path is partitioned into a plurality of sections in the peripheral direction. A portion of the air sucked into the delivery fan is introduced into the recirculation flow path as a swirling flow, and is straightened by the above fins.

CITATION LIST

Patent Literature

[PTL 1] Japanese Unexamined Patent Application Publication No. 2013-224584

SUMMARY OF INVENTION

Technical Problem

However, in the technique of PTL 1, a gap may be generated between the compressor cover body and the fins due to thermal expansion, vibration, or the like of the compressor cover. If a gap is generated, an unintended flow may occur when the air flowing through each section of the recirculation flow path enters other sections via this gap. In this case, the swirling flow introduced into the recirculation flow path cannot be suitably straightened, and it becomes difficult for the originally intended performance of the centrifugal compressor to be exhibited.

The invention has been made in view of such problems, and an object thereof is to provide a compressor cover, a centrifugal compressor, a turbocharger, and a compressor cover manufacturing method that can suppress degradation of performance.

Solution to Problem

The invention adopts the following means in order to solve the above problems.

That is, a compressor cover related to a first aspect of the invention is a compressor cover that covers a delivery fan which discharges, to a radial outer side, a fluid sucked in from a direction of an axis by rotating around the axis. The compressor cover includes a cover body that includes a tubular part in which a tubular inner peripheral surface along the axis and a shroud surface that is disposed on a downstream side of the tubular inner peripheral surface in the direction of the axis and expands in diameter toward the downstream side in the direction of the axis are formed; and a sleeve that includes an outer tube having an outer peripheral surface that is fixed to the tubular inner peripheral surface, an inner tube that is disposed on a radially inner side of the outer tube and defines a recirculation flow path, through which a portion of the fluid that is sucked in by the delivery fan flows, between the inner tube and the outer tube, and a plurality of struts that are disposed at intervals in a peripheral direction so as to connect the outer tube and the inner tube together, thereby partitioning the recirculation flow path into a plurality of sections.

According to such a configuration, the sleeve has the outer tube, the inner tube, and the struts, and the outer tube is fixed to the tubular inner peripheral surface of the cover body. Therefore, it is possible to prevent or alleviate a situation in which a gap is generated between the plurality of sections of the recirculation flow path. Consequently, leak-out of the fluid between the sections of the recirculation flow path can be avoided, and generation of an unintended flow between the cover body and the sleeve can be suppressed.

In the above compressor cover, it is preferable that an outer peripheral surface of the outer tube is fitted to the tubular inner peripheral surface.

Accordingly a member for fixing the sleeve to the cover body can be made unnecessary, and part costs and the number of assembling steps can be reduced.

In the above compressor cover, it is preferable that the recirculation flow path extends in a direction along the axis, and a whole region of the recirculation flow path in the direction of the axis is defined by an outer tube and an inner tube of the sleeve.

Accordingly, struts with a higher straightening effect that can prevent leak-out of the fluid between the sections of a recirculation flow path in a wide range in the direction of the axis direction can be formed.

Moreover, since the sleeve is formed in the whole region of the recirculation flow path, a high-rigidity sleeve can be realized, and resonance of the sleeve resulting from the fluid flowing through the inside of the centrifugal compressor or the rotation of the delivery fan can be avoided.

In the above compressor cover it is preferable that the tubular part includes a stepped part that extends from an end part of the tubular inner peripheral surface on the downstream side in the direction of the axis toward a radially inner side and is connected to an end part of the shroud surface on an upstream side in the direction of the axis, and a slit that allows the recirculation flow path to communicate with the radially inner side is defined by the stepped part and the end part of the inner tube on the downstream side.

Accordingly, since it is not necessary to separately form a slit for allowing the recirculation flow path to communicate with the radially inner side in the sleeve, the sleeve can be easily molded.

In the above compressor cover, it is preferable that an end part of the outer tube on the downstream side abuts against the stepped part.

Accordingly, since positioning between the cover body and the sleeve can be easily performed, the above slit can be reliably formed.

In the above compressor cover, it is preferable that an outer peripheral surface of the outer tube includes an upstream region, and a downstream region that is continuous with a downstream side of the upstream region in the direction of the axis, and the upstream region has a greater fitting degree with respect to the tubular inner peripheral surface than the downstream region.

Moreover, in the above compressor cover, it is preferable that the upstream region has a greater fitting degree with respect to the tubular inner peripheral surface than the downstream region due to an external diameter of the upstream region being greater than an external diameter of the downstream region.

Additionally, in the above compressor cover, the upstream region may have a greater fitting degree with respect to the tubular inner peripheral surface than the downstream region due to an internal diameter of a region of the tubular inner peripheral surface corresponding to the upstream region being smaller than that of a region of the tubular inner peripheral surface corresponding to the downstream region.

In the centrifugal compressor including the compressor cover, generally, the downstream side in the direction of the axis reaches a higher temperature. By increasing the fitting degree of the upstream region of the sleeve that is not easily influenced by a high temperature, the compressor cover and the sleeve can be firmly integrated. By making the fitting degree of the downstream region of the sleeve that is easily influenced by a high temperature small, generation of a thermal stress can be suppressed, and durability can be improved.

In the above compressor cover, it is preferable that the cover body further includes a scroll part, which extends in a peripheral direction and forms a scroll flow path into which a fluid discharged from the delivery fan is introduced, on an outer peripheral side of the tubular part, and a boundary between the upstream region and the downstream region is located at the same position in the direction of the axis as an end part of the scroll flow path on the upstream side in the direction of the axis or located closer to the upstream side in the direction of the axis than the position, in the direction of the axis, of the end part of the scroll flow path on the upstream side in the direction of the axis.

In the centrifugal compressor including the compressor cover, particularly the scroll flow path reaches a high temperature. Consequently, by arranging the boundary between the upstream region and the downstream region as described above, durability can be improved while solidifying the integration between the compressor cover and the sleeve.

It is preferable that the above compressor cover further includes an O ring that is interposed between the tubular inner peripheral surface and the outer peripheral surface of the outer tube.

That is, because of the configuration in which a gap and a fitting part formed by the outer tube and the cover body of the sleeve are circularly formed, the O ring can be disposed in the gap and the fitting part. As a result, generation of an unintended flow between the cover body and the sleeve can be avoided.

A centrifugal compressor related to a second aspect of the invention includes the above compressor cover; and the delivery fan covered with the compressor cover.

A turbocharger related to a third aspect of the invention includes the above centrifugal compressor; and a drive unit that rotates the delivery fan of the centrifugal compressor around the axis.

A compressor cover manufacturing method related to a fourth embodiment of the invention is a compressor cover manufacturing method for manufacturing a compressor cover that covers a delivery fan which discharges, to a radial outer side, a fluid sucked in from a direction of an axis by rotating around the axis. The method includes a step of forming a cover body that includes a tubular part in which a tubular inner peripheral surface along the axis and a shroud surface that is disposed on a downstream side of the tubular inner peripheral surface in the direction of the axis and expands in diameter toward the downstream side are formed; a step of molding a sleeve that includes an outer tube having an outer peripheral surface that is fixed to the tubular inner peripheral surface, an inner tube that is disposed on a radially inner side of the outer tube and defines a recirculation flow path, through which a portion of the fluid that is sucked in by the delivery fan flows, between the inner tube and the outer tube, and a plurality of struts that are disposed at intervals in a peripheral direction so as to connect the outer tube and the inner tube together, thereby partitioning the recirculation flow path into a plurality of sections; and a step of inserting the sleeve from the upstream side of the tubular part in the direction of the axis such that an outer peripheral surface of the outer tube is fixed to the tubular inner peripheral surface.

In the above compressor cover manufacturing method, it is preferable that the outer peripheral surface of the outer tube is made fittable to the tubular inner peripheral surface, and the step of inserting the sleeve is a step of inserting the sleeve such that the outer peripheral surface of the outer tube is fitted to the tubular inner peripheral surface.

Accordingly, a compressor cover in which fluid does not leak out between the sections of the recirculation flow path can be easily manufactured.

In the above compressor cover manufacturing method, it is preferable that the step of molding the sleeve is a step of integrally molding the sleeve by injection molding or lost wax casting.

By providing the sleeve separately from the cover body, this sleeve can be integrally molded by injection molding or lost wax casting. Accordingly, since the shape of the sleeve can be more intricately and precisely molded, it is possible to easily manufacture a compressor cover with intended performance.

Advantageous Effects of Invention

According to the compressor cover, the centrifugal compressor, the turbocharger, and the compressor cover manufacturing method of the invention, leak-out of the fluid between the sections of the recirculation flow path can be avoided. Therefore, degradation of performance can be suppressed.

DESCRIPTION OF EMBODIMENTS

Hereinafter, a turbocharger related to an embodiment of the invention will be described in detail with reference to FIGS. 1 to 5.

Figure 1:
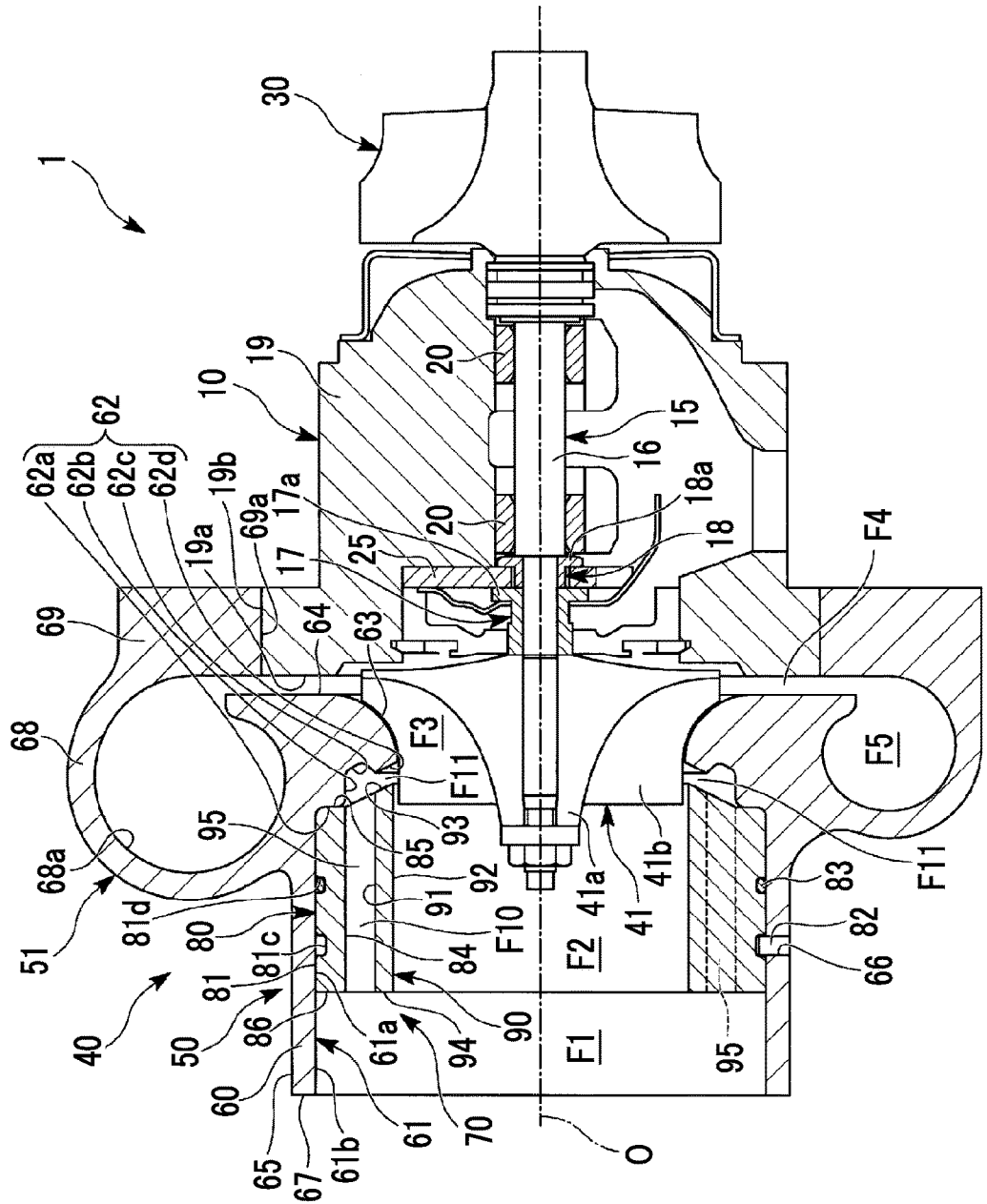
FIG. 1 is a longitudinal sectional view of a turbocharger related to an embodiment of the invention.

As illustrated in FIG. 1, a turbocharger 1 includes a turbocharger body 10, a radial turbine 30 (drive unit), and a centrifugal compressor 40 having a compressor cover 50. In the turbocharger 1, the radial turbine 30 is rotated by the flue gas from an engine (not illustrated), and the centrifugal compressor 40 supplies compressed air (fluid) to the engine with the rotation.

The turbocharger body 10 is disposed between the radial turbine 30 and the centrifugal compressor 40 so as to be sandwiched by the radial turbine 30 and the centrifugal compressor 40, and includes a rotor 15, a bearing housing 19, a journal bearing 20, and a thrust bearing 25.

The rotor 15 has a rod-shaped rotor body 16 that extends with an axis O as a center over the radial turbine and the centrifugal compressor 40. A first thrust collar 17 and a second thrust collar 18 are attached to the rotor body 16 integrally with this rotor body 16. The first thrust collar 17 and the second thrust collar 18 are externally fitted to an outer peripheral surface of the rotor body 16, respectively, so as to form a tubular shape. The first thrust collar 17 and the second thrust collar 18 are respectively disposed close to each other in the direction of the axis O, the first thrust collar 17 is disposed on a centrifugal compressor 40 side (a left side in FIG. 1), and the second thrust collar 18 is disposed on a radial turbine 30 side (a right side in FIG. 1). The first thrust collar 17 and the second thrust collar 18 respectively have disk-shaped flanges 17a and 18a, which overhang toward a radially outer side, at end parts thereof on the radial turbine 30 side.

The bearing housing 19 is disposed so as to surround the rotor 15 from the outer peripheral side thereof, and is disposed such that an end part of the rotor body 16 on the centrifugal compressor 40 side protrudes from this bearing housing 19. An end surface of the bearing housing on the centrifugal compressor 40 side forms a flat surface shape orthogonal to the axis O, and is an annular end surface 19a that forms an annular shape with the axis O as a center. An outer peripheral part of the bearing housing 19 connected to an outer peripheral edge of the annular end surface 19a is a coupling outer peripheral part 19b to be coupled to the compressor cover 50.

The journal bearing 20 is provided between the rotor body 16 and the bearing housing 19, has an outer peripheral part fixed to the bearing housing 19, and has a journal pad surface, which slides on the outer peripheral surface of the rotor body 16, formed on an inner peripheral side thereof. In the present embodiment, a pair of the journal bearings 20 is provided at an interval in the direction of the axis O. The rotor 15 is supported by the journal bearings 20 so as to be rotatable around the axis O, and a radial load generated in the rotor 15 is supported by the journal bearings 20.

In addition, float bearings may be used instead of the journal bearings 20. In this case, the float bearings are disposed so as to be relatively rotatable around the axis with respective to the bearing housing 19. Accordingly, the float bearings rotate around the axis with the rotation of the rotor body 16.

The thrust bearing 25 is disposed such that a portion thereof on the radially outer side is fixed to the bearing housing 19, and a portion thereof on a radially inner side is sandwiched from the axis O by the flange 17a of the first thrust collar 17 and the flange 18a of the second thrust collar 18. Surfaces, which face both sides in the direction of the axis O, in the portion of the thrust bearing 25 on the inner peripheral side are thrust pad surfaces that abuts against the flange 17a of the first thrust collar 17 and the flange 18a of the second thrust collar 18, respectively, from the direction of the axis O. A thrust load generated in the rotor 15 is supported by the thrust bearing 25 via the first thrust collar 17 and the second thrust collar 18.

The radial turbine 30 is fixed to an end part of the rotor body 16 of such a turbocharger body 10. The radial turbine 30 discharges the flue gas introduced from the radially outer side in the direction of the axis O. The radial turbine 30 rotates around the axis O by the flow of such an flue gas, and the rotor 15 integrally fixed to the radial turbine 30 rotates around the axis O with the rotation.

In addition, although illustration is omitted, a turbine housing is provided on an outer peripheral side of the radial turbine 30 so as to cover the radial turbine 30 from the radially outer side.

Next, the centrifugal compressor 40 will be described. As illustrated in FIG. 1, the centrifugal compressor 40 of the present embodiment is provided on the side of the turbocharger body 10 opposite to the radial turbine 30, and includes a delivery fan 41 and the compressor cover 50.

As illustrated in FIG. 1, the delivery fan 41 has a boss part 41a integrally fixed to the end part of the rotor body 16, and a plurality of vanes 41b disposed at intervals in a peripheral direction on an outer peripheral surface of the boss part 41a. The delivery fan 41 discharges the air sucked in from the side opposite to the radial turbine 30 in the direction of the axis O toward the radially out side by rotating around the axis O together with the rotor 15. In the following, a suction side (an opposite side of the radial turbine 30; the left side in FIGS. 1 and 2) of air in the direction of the axis O of the centrifugal compressor 40 is referred to as an upstream side in the direction of the axis O, and an opposite side (the radial turbine 30 side; the right side in FIGS. 1 and 2) of the upstream side in the direction of the axis O is referred to as a downstream side in the direction of the axis O.

The compressor cover 50 is a member that covers the delivery fan 41, and as illustrated in FIGS. 1 to 4, includes the cover body 51 and a sleeve 70. The compressor cover 50 is molded from, for example, metallic materials, such as steel and aluminum.

The cover body 51 forms an outer shape of the compressor cover 50, and has a tubular part 60, a scroll part 68, and a coupling part 69 that are integrally molded to each other.

The tubular part 60 is a portion that forms a substantially tubular shape that extends with the axis O as a center. A tubular inner peripheral surface 61, a stepped part 62, and a shroud surface 63 disposed in order from the upstream side in the direction of the axis O toward the downstream side in the direction of the axis O formed on an inner peripheral part of the tubular part 60.

The tubular inner peripheral surface 61 forms a tubular surface shape that extends parallel to the axis O with the axis O as a center. In the tubular inner peripheral surface 61, a sectional shape orthogonal to the axis O is a round shape, and extends in the direction of the axis O with a constant diameter. The tubular inner peripheral surface 61 forms an opening of the tubular part 60 on the upstream side in the direction of the axis O. In the tubular inner peripheral surface 61, a region on the downstream side in the direction of the axis O is a fitting region 61a to which the sleeve 70 is fitted, and the region of the fitting region 61a on the upstream side in the direction of the axis O is a non-fitting region 61b that forms the above opening.

The stepped part 62 is located on the downstream side of the tubular inner peripheral surface 61 in the direction of the axis O, and has an abutting surface 62a, a stepped part tubular surface 62b, a curved surface 62c, and a slit-forming surface 62d in order from the upstream side in the direction of the axis O toward the downstream side in the direction of the axis O.

The abutting surface 62a is a surface that extends from an end part of the tubular inner peripheral surface 61 on the downstream side in the direction of the axis O toward the radially inner side. This abutting surface 62a forms an annular shape that faces the upstream side in the direction of the axis O, and is a flat surface orthogonal to the axis O in the present embodiment.

The stepped part tubular surface 62b forms a tubular surface shape that extends parallel to the axis O with the axis O as a center, and extends with a constant diameter from an end part of the abutting surface 62a on the radially inner side toward the downstream side in the direction of the axis O.

The curved surface 62c is a surface that extends from an end part of the stepped part tubular surface 62b on the downstream side in the direction of the axis O toward the radially inner side. The curved surface 62c forms an annular shape that faces the upstream side in the direction of the axis O, and is recessed so as to curve toward the upstream side in the direction of the axis O.

The slit-forming surface 62d is a surface that further extends from an end part of the curved surface 62c on the radially inner side toward the radially inner side. In this way, the slit-forming surface 62d forms an annular shape that faces the upstream side in the direction of the axis O, and forms a tapered surface shape that is inclined toward the upstream side in the direction of the axis O as it becomes closer to the radially inner side. In other words, the slit-forming surface 62d forms a tapered surface shape that gradually reduces in diameter as it becomes closer to the downstream side in the direction of the axis O.

The shroud surface 63 is a surface that expands in diameter so as to gradually curve from the end part of the stepped part 62 on the downstream side in the direction of the axis O, that is, from an end part on the slit-forming surface 62d on the downstream side in the direction of the axis O, to the radial outer side as it becomes closer to the downstream side in the direction of the axis O. Tips of the vanes 41b of the delivery fan 41 covered with the compressor cover 50 face the shroud surface 63 in the direction of the axis O. Consequently, the curve of the shroud surface 63 has a shape corresponding to the curve of a tip of the delivery fan 41.

A bolt insertion hole 66 that allows the tubular inner peripheral surface 61 to communicate with the radially outer side therethrough is formed in the tubular part 60 having such an inner peripheral part. That is, this bolt insertion hole 66 is formed so as to pass through the tubular inner peripheral surface 61 and the outer peripheral surface 65 of the tubular part 60.

An end surface that connects the outer peripheral surface 65 and the tubular inner peripheral surface 61 together on the upstream side of the tubular part 60 in the direction of the axis O forms a flat surface shape orthogonal to the axis O, and is a tubular part inlet end surface 67 that forms an annular shape centered on the axis O and faces the upstream side in the direction of the axis O.

An end surface of the tubular part 60 on the downstream side in the direction of the axis O is a diffuser-forming surface 64 that defines a diffuser flow path F4 through which the fluid discharged from the delivery fan 41 flows. The diffuser-forming surface 64 forms a flat shape orthogonal to the axis O and forms an annular shape centered on the axis O. An end part of the diffuser-forming surface 64 on the radially inner side is connected to an end part (an end part on the radially outer side) of the shroud surface 63 on the downstream side in the direction of the axis O.

Figure 3:
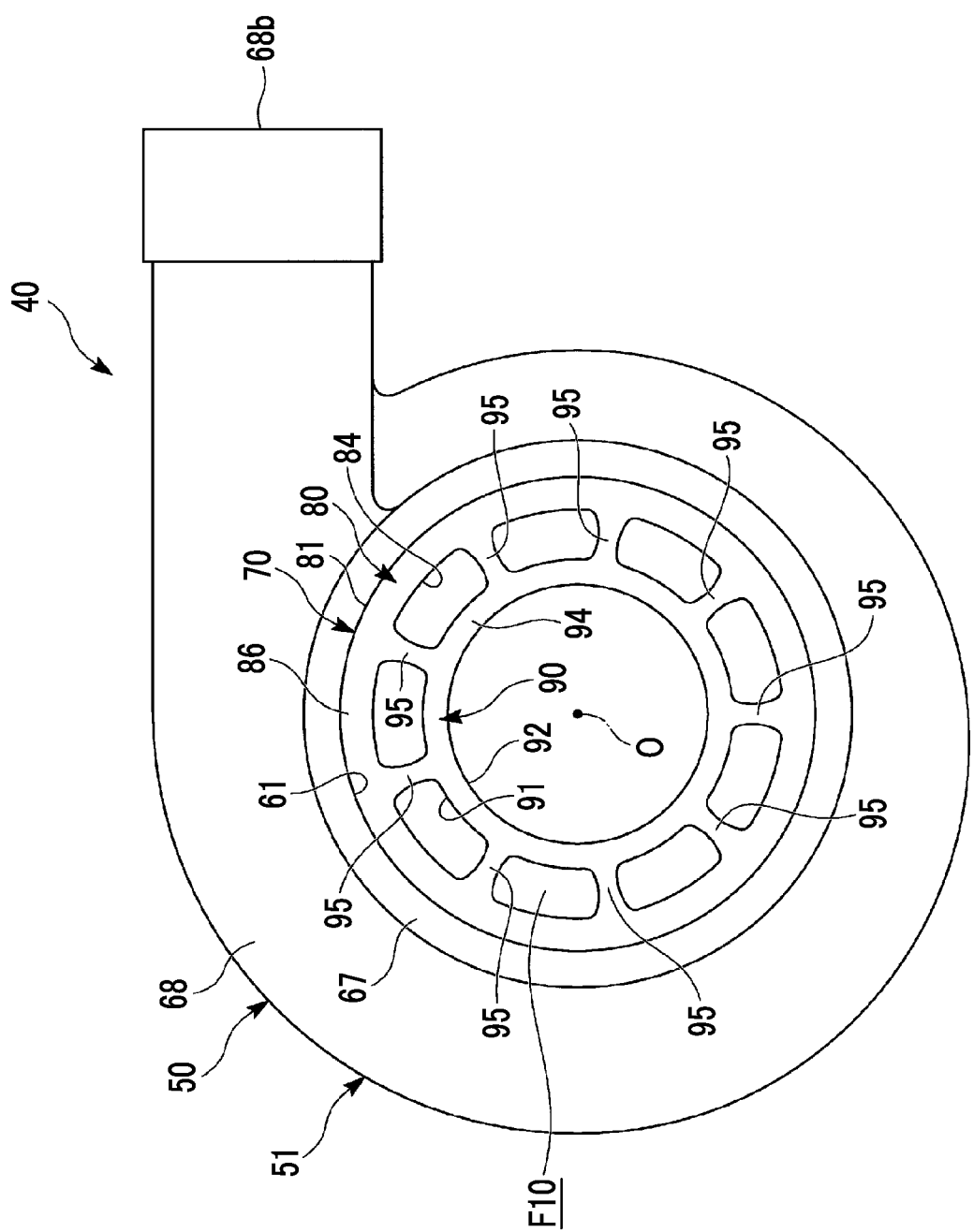
FIG. 3 is a view when the compressor cover related to the embodiment of the invention is seen from an axially upstream side.

The scroll part 68 is integrally provided in the tubular part 60 such that the tubular part 60 is wound around an outer peripheral side of the tubular part 60 in the peripheral direction. A scroll flow path F5 of which a sectional shape including the axis O forms a round shape and extends in the peripheral direction is formed inside the scroll part 68. The scroll flow path F5 is defined by a scroll-forming surface 68a that is an inside surface of the scroll part 68. Additionally, as illustrated in FIG. 3, an outlet part 68b that allows the scroll flow path F5 to communicate with the outside therethrough formed in a portion of the scroll part 68 in the peripheral direction. The outlet part 68b communicates with a combustion chamber of an engine (not illustrated).

The coupling part 69 is integrally provided on the downstream side of the scroll part 68 in the direction of the axis O. A coupling inner peripheral part 69a centered on the axis O is formed on the radially inner side of the coupling part 69. As illustrated in FIG. 1, the coupling inner peripheral part 69a is coupled to the coupling outer peripheral part 19b of the bearing housing 19. Accordingly, the cover body 51 of the compressor cover 50 is fixed integrally with the bearing housing 19.

Figure 2:
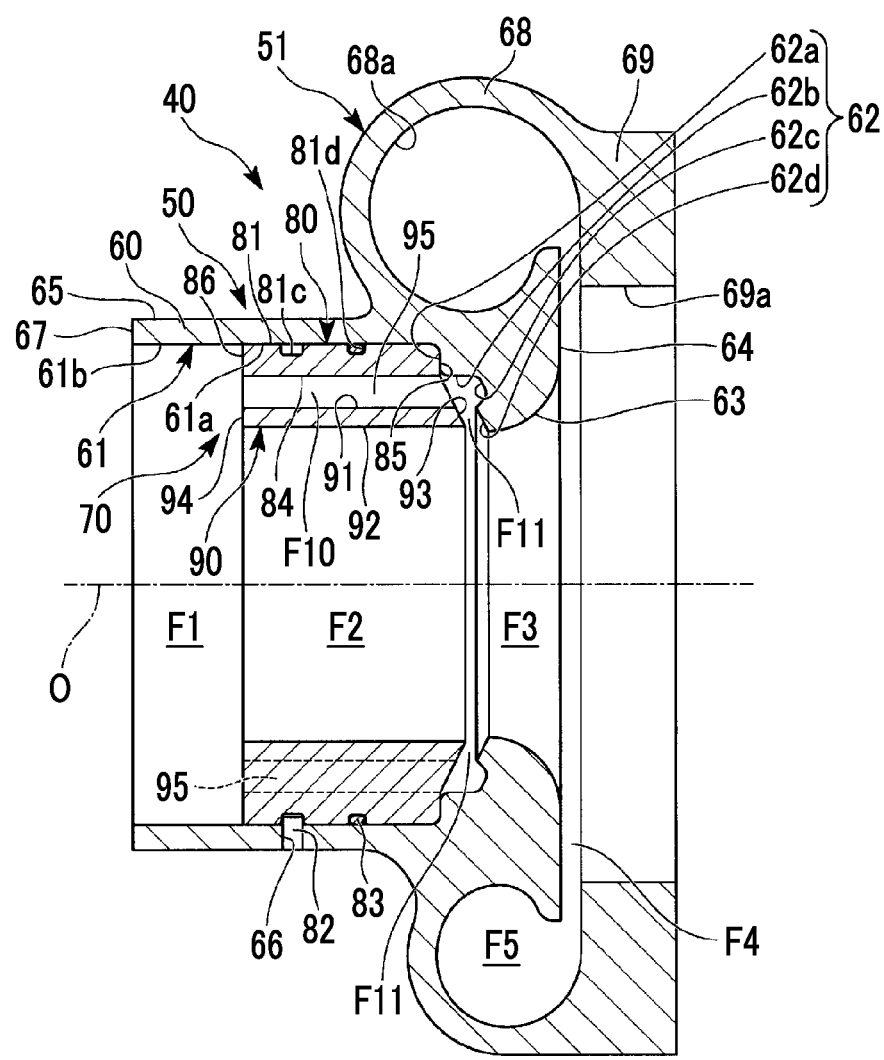
FIG. 2 is a longitudinal sectional view of a compressor cover related to the embodiment of the invention.

Next, the sleeve 70 will be described. As illustrated in FIGS. 1 to 3, the sleeve 70 is fitted into the inside of the cover body 51 so as to become integral with the cover body 51, and has an outer tube 80, an inner tube 90 and a plurality of struts 95 that are integrally molded. The sleeve 70 is molded from, for example, metallic materials, such as resin, steel, and aluminum.

The outer tube 80 forms a tubular shape centered on the axis O. The length of the outer tube 80 in the direction of the axis O is set so as to become equal to or smaller than the length of the tubular inner peripheral surface 61 of the tubular part 60 in the direction of the axis O.

An outer peripheral surface 81 of the outer tube 80 forms a tubular surface shape that extends parallel to the axis O with the axis O as a center. In the outer peripheral surface 81 of the outer tube 80, a sectional shape orthogonal to the axis O is a round shape, and extends in the direction of the axis O with a constant diameter. The outer peripheral surface 81 of the outer tube 80 is fitted to the fitting region 61a in the tubular inner peripheral surface 61 of the cover body 51 from the inside.

An inner peripheral surface 84 of the outer tube 80 forms a tubular surface shape that extends parallel to the axis O with the axis O as a center. In the inner peripheral surface 84 of the outer tube 80, a sectional shape orthogonal to the axis O is a round shape, and extends in the direction of the axis O with a constant diameter. Additionally, the length of the inner peripheral surface 84 of the outer tube 80 is made equal to that of the outer peripheral surface 81 of the outer tube 80 in the direction of the axis O, and is disposed at the same position in the direction of the axis O as the outer peripheral surface 81 of the outer tube 80.

An end surface that connects the outer peripheral surface 81 and the inner peripheral surface 84 of the outer tube 80 together on the downstream side in the direction of the axis O forms a flat shape orthogonal to the axis O, and is an outer tube downstream end surface 85 that forms an annular shape centered on the axis O and faces the upstream side in the direction of the axis O. The outer tube downstream end surface 85 abuts against the abutting surface 62a in the stepped part 62 of the cover body 51 from the upstream side in the direction of the axis O in a state where the outer tube 80 is fitted into the inside of the cover body 51.

An end surface that connects the outer peripheral surface 81 and the inner peripheral surface 84 of the outer tube 80 together on the upstream side in the direction of the axis O forms a flat shape orthogonal to the axis O, and is an outer tube upstream end surface 86 that forms an annular shape centered on the axis O and faces the downstream side in the direction of the axis O.

Figure 5:
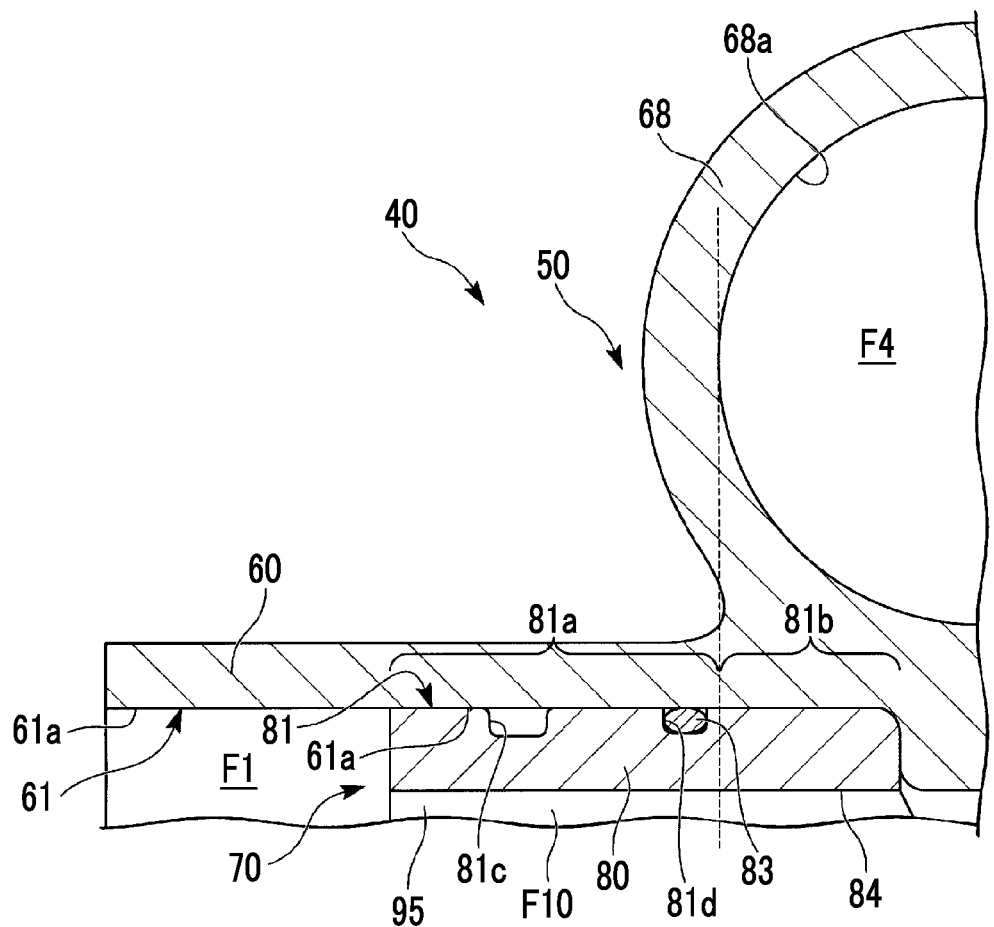
FIG. 5 is a partially enlarged view of FIG. 2.

Here, the outer peripheral surface 81 of the outer tube 80 will be described in more detail. As illustrated in FIG. 5, a portion of the outer peripheral surface 81 of the outer tube 80 on the upstream side in the direction of the axis O is an upstream region 81a, and a portion of the outer peripheral surface 81 of the outer tube 80 on the downstream side in the direction of the axis O connected to the upstream region 81a is a downstream region 81b. The upstream region 81a forms a tubular surface shape that extends in the direction of the axis O with a constant diameter, and the downstream region 81b also forms a tubular surface shape that extends in the direction of the axis O with a constant diameter.

The upstream region 81a is formed such that the external diameter thereof is greater than the downstream region 81b, and the fitting degree of the tubular inner peripheral surface 61 with respect to the fitting region 61a is set to a large value. In the present embodiment, the upstream region 81a of the outer peripheral surface 81 of the outer tube 80 is interference-fitted to the tubular inner peripheral surface 61, and the downstream region 81b of the outer peripheral surface 81 of the outer tube 80 is clearance-fitted to the tubular inner peripheral surface 61. In addition, the invention is not limited to this. For example, the upstream region 81a may be interference-fitted, and the downstream region 81b may be transition-fitted.

Additionally, each of the upstream region 81a and the downstream region 81b may be interference-fitted. In this case, the fitting degree of the upstream region 81a is made greater than that of the downstream region 81b by the interference of the upstream region 81a being set to be greater than that of the downstream region 81b.

A boundary between the upstream region 81a and the downstream region 81b is located at the same position in the direction of the axis O as an end part of the scroll flow path F5 in the direction of the axis O. In addition, the boundary may be located closer to the upstream side in the direction of the axis O than the end part of the axis O of the scroll flow path F5 on the upstream side in the direction of the axis O, and more preferably may be located closer to the upstream side in the direction of the axis O than the end part of the scroll part 68 on the upstream side in the direction of the axis O.

A first recessed groove 81c that is recessed from the outer peripheral surface 81 and annularly extends with the axis O as a center in the peripheral direction is formed in the outer peripheral surface 81 of the outer tube 80. In the present embodiment, the first recessed groove 81c is formed in the upstream region 81a in the outer peripheral surface 81 of the outer tube 80. The first recessed groove 81c is formed at the same position in the direction of the axis O as the bolt insertion hole 66 of the cover body 51 in a state where the sleeve 70 is fitted into the cover body 51.

A retaining bolt 82 is inserted into the bolt insertion hole 66 from an outer peripheral side of the cover body 51. When a tip of the retaining bolt 82 is fitted into the first recessed groove 81c, the sleeve 70 is fixed so as to be immovable in the direction of the axis O relative to the cover body 51.

A second recessed groove 81d that is recessed from the outer peripheral surface 81 and annularly extends with the axis O as a center in the peripheral direction is formed closer to the downstream side in the direction of the axis O than the first recessed groove 81c in the outer peripheral surface 81 of the outer tube 80. In the present embodiment, the second recessed groove 81d is formed in the upstream region 81a in the outer peripheral surface 81 of the outer tube 80.

An O ring 83 that forms an annular shape that extends over the entire circumference of the second recessed groove 81d is provided in the second recessed groove 81d. The O ring 83 is formed from elastic materials, such as rubber, and is deformed so as to be crushed in a state where the sleeve 70 is fitted into the cover body 51. Accordingly, while an outer peripheral part of the O ring 83 comes into close contact with the tubular inner peripheral surface 61 of the cover body 51 over the entire circumference thereof, and an inner peripheral part thereof comes into close contact with a bottom part of the second recessed groove 81d of the outer tube 80 over the entire circumference thereof. In this way, the O ring 83 is interposed between the cover body 51 and the outer tube 80.

The inner tube 90 forms a tubular shape that has a smaller internal diameter and external diameter than the outer tube 80 and has a greater length in the direction of the axis O than the outer tube 80. The inner tube 90 is disposed at a distance from the inner peripheral surface 84 coaxially with the outer tube 80 inside the inner peripheral surface 84 of the outer tube 80.

An outer peripheral surface 91 of the inner tube 90 forms a tubular surface shape centered on the axis O, and extends in the direction of the axis O with a constant diameter. The length of the outer peripheral surface 91 of the inner tube 90 in the direction of the axis O is made greater than the length of the outer tube 80 in the direction of the axis O. An end part of the outer peripheral surface 91 of the inner tube 90 on the upstream side in the direction of the axis O is disposed at the same position in the direction of the axis O as an upstream end surface of the outer tube 80. The outer peripheral surface 91 of the inner tube 90 defines an annular space that extends in the radial direction and in the peripheral direction in cooperation with the inner peripheral surfaces 84 of the outer tube 80, and the space is a recirculation flow path F10. The recirculation flow path F10 is discontinuously defined in the peripheral direction by the struts 95 to be described below. Additionally, the recirculation flow path F10 extends in the direction (a direction parallel to the axis in the present embodiment) along the axis O, and the whole region of the recirculation flow path F10 of the direction of the axis O is defined by the outer tube 80 and the inner tube 90.

An inner peripheral surface 92 of the inner tube 90 forms a tubular surface shape centered on the axis O, and extends in the direction of the axis O with a constant diameter. The length of the inner peripheral surface 92 of the inner tube 90 in the direction of the axis O is set to be greater than the outer peripheral surface 91 of the inner tube 90. While an end part of the inner peripheral surface 92 of the inner tube 90 on the upstream side in the direction of the axis O is disposed at the same position in the direction of the axis O as the end part of the outer peripheral surface 91 of the inner tube 90 on the upstream side in the direction of the axis O, and an end part of the inner peripheral surface 92 of the inner tube 90 of the downstream side in the direction of the axis O is disposed closer to the downstream side in the direction of the axis O than an end part of the outer peripheral surface 91 of the inner tube 90 on the downstream side in the direction of the axis O. Additionally, in the present embodiment, the internal diameter of the inner peripheral surface 92 of the inner tube 90 is set to be equal to the internal diameter of an end part of the shroud surface 63 of the cover body 51 on the upstream side in the direction of the axis O.

An end surface on the downstream side in the direction of the axis O that connects the outer peripheral surface 91 and the inner peripheral surface 92 of the inner tube 90, which hit the end part of the inner tube 90 on the downstream side, together on the downstream side in the direction of the axis O is an inner tube downstream end surface 93 that forms an annular shape that faces the downstream side in the direction of the axis O. The inner tube downstream end surface 93 forms a tapered surface shape that extends toward the downstream side in the direction of the axis O as it becomes closer to the radially inner side from the radially outer side. In the present embodiment, in a state where the sleeve 70 is fitted into the cover body 51, the inner tube downstream end surface 93 is parallel to the slit-forming surface 62d in the stepped part 62 of the cover body 51, and is disposed apart in the direction of the axis O from the slit-forming surface 62d. Accordingly, a slit F11 that allows the recirculation flow path F10 to communicate with spaces inside the inner tube 90 and the shroud surface 63 of the cover body 51 is defined between the inner tube downstream end surface 93 and the slit-forming surface 62d.

An end surface on the upstream side in the direction of the axis O that connects the outer peripheral surface 91 and the inner peripheral surface 92 of the inner tube 90, which hit the end part of the inner tube 90 on the upstream side, together on the upstream side in the direction of the axis O is an inner tube upstream end surface 94 that forms a flat shape orthogonal to the axis O and forms an annular shape that faces the upstream side in the direction of the axis O. The position of the inner tube upstream end surface 94 in the direction of the axis O is made the same as that of the outer tube upstream end surface 86.

The struts 95 connect the inner peripheral surface 84 of the outer tube 80 and the outer peripheral surface 91 of the inner tube 90 together such that the relative positions thereof become uniquely determined. In the present embodiment, the struts 95 extend parallel to the axis O in the direction of the axis O of the outer tube 80 and the inner tube 90, and as illustrated in FIG. 3, the plurality of the struts are provided at intervals in the peripheral direction. Accordingly, the struts 95 partition the recirculation flow path F10 defined by the outer tube 80 and the inner tube 90 into a plurality of sections in the peripheral direction. Additionally, the relative positions of the outer tube 80 and the inner tube 90 are uniquely fixed by the struts 95.

As illustrated in FIG. 1, the compressor cover 50 constituted of such cover body 51 and sleeve 70 is disposed such that the delivery fan 41 fixed to the rotor body 16 is covered from the outer peripheral side. In this case, the edge of the delivery fan 41 faces the shroud surface 63. Additionally, a portion of the edge of the delivery fan 41 on the upstream side faces the inner peripheral surface 92 of the inner tube 90. Accordingly, the slit F11 formed between the shroud surface 63 and the inner peripheral surface 92 of the inner tube 90 is disposed to face the edge of the delivery fan 41 from the radial direction.

Additionally, when the coupling inner peripheral part 69a in the coupling part 69 is engaged with the coupling outer peripheral part 19b of the bearing housing 19, the compressor cover 50 and the turbocharger body 10 are integrally coupled. In this case, the diffuser-forming surface 64 in the tubular part 60 of the cover body 51 is brought into a state where the diffuser-forming surface is spaced apart from the annular end surface 19a of the bearing housing 19 in the direction of the axis O. Additionally, an outer peripheral side of the annular end surface 19a becomes flush with the scroll-forming surface 68a of the scroll part 68.

A main flow path through which air is sucked in and discharged by the delivery fan 41 is formed inside the compressor cover 50. The main flow path is constituted of an upstream suction flow path F1, a downstream suction flow path F2, a diameter-expanded flow path F3, and a diffuser flow path F4. The upstream suction flow path F1 is a space of the non-fitting region 61b on the radially inner side, in the tubular inner peripheral surface 61 of the cover body 51. The downstream suction flow path F2 is a space inside the inner peripheral surface 92 of the inner tube 90 of the sleeve 70, and is connected to a downstream side of the upstream suction flow path F1. The diameter-expanded flow path F3 is a space inside the shroud surface 63, and is connected to a downstream side of the downstream suction flow path F2. The vanes 41b of the delivery fan 41 are disposed over the downstream suction flow path F2 and the diameter-expanded flow path F3.

The diffuser flow path F4 is a space that is defined by the diffuser-forming surface 64 of the tubular part 60 of the cover body 51 and the annular end surface 19a of the bearing housing 19, and is formed in an annular shape that widens in the radial direction and in the peripheral direction. An end part of the diffuser flow path F4 on the radially inner side is connected to the diameter-expanded flow path F3, and an end part thereof on the radially outer side is connected to the diffuser flow path F4.

Additionally, in the recirculation flow path F10, an upstream opening between the upstream end part of the outer tube 80 and the upstream end part of the inner tube 90 is connected to the upstream suction flow path F1 from the downstream side in the direction of the axis O. An end part of the slit F11 on the radially outer side is connected to the recirculation flow path F10, and an end part thereof on the radially inner side is connected to a boundary between the downstream suction flow path F2 and the diameter-expanded flow path F3 in the main flow path.

Figure 6:
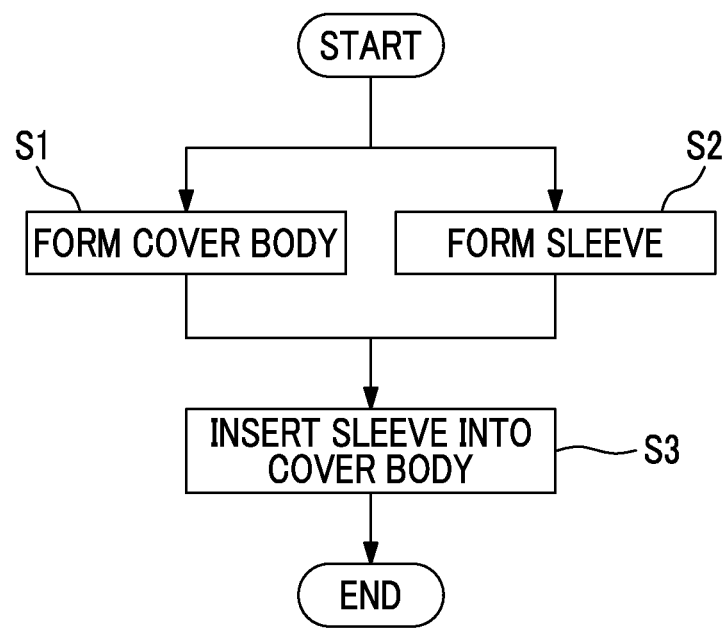
FIG. 6 is a flowchart illustrating a procedure of a compressor cover manufacturing method.

Next, a method for manufacturing the compressor cover 50 having the above configuration will be described with reference to a flowchart illustrated in FIG. 6. The manufacturing method includes a cover body molding step S1, a sleeve molding step S2, and an insertion step S3.

In the cover body molding step S1, the cover body 51 having the above configuration is molded by performing cutting work after a prototype of the cover body is molded by sandcast. In the sleeve molding step S2, the sleeve 70 consisting of the outer tube 80, the inner tube 90, and the struts 95 is molded by injection molding or lost wax casting.

Figure 4:
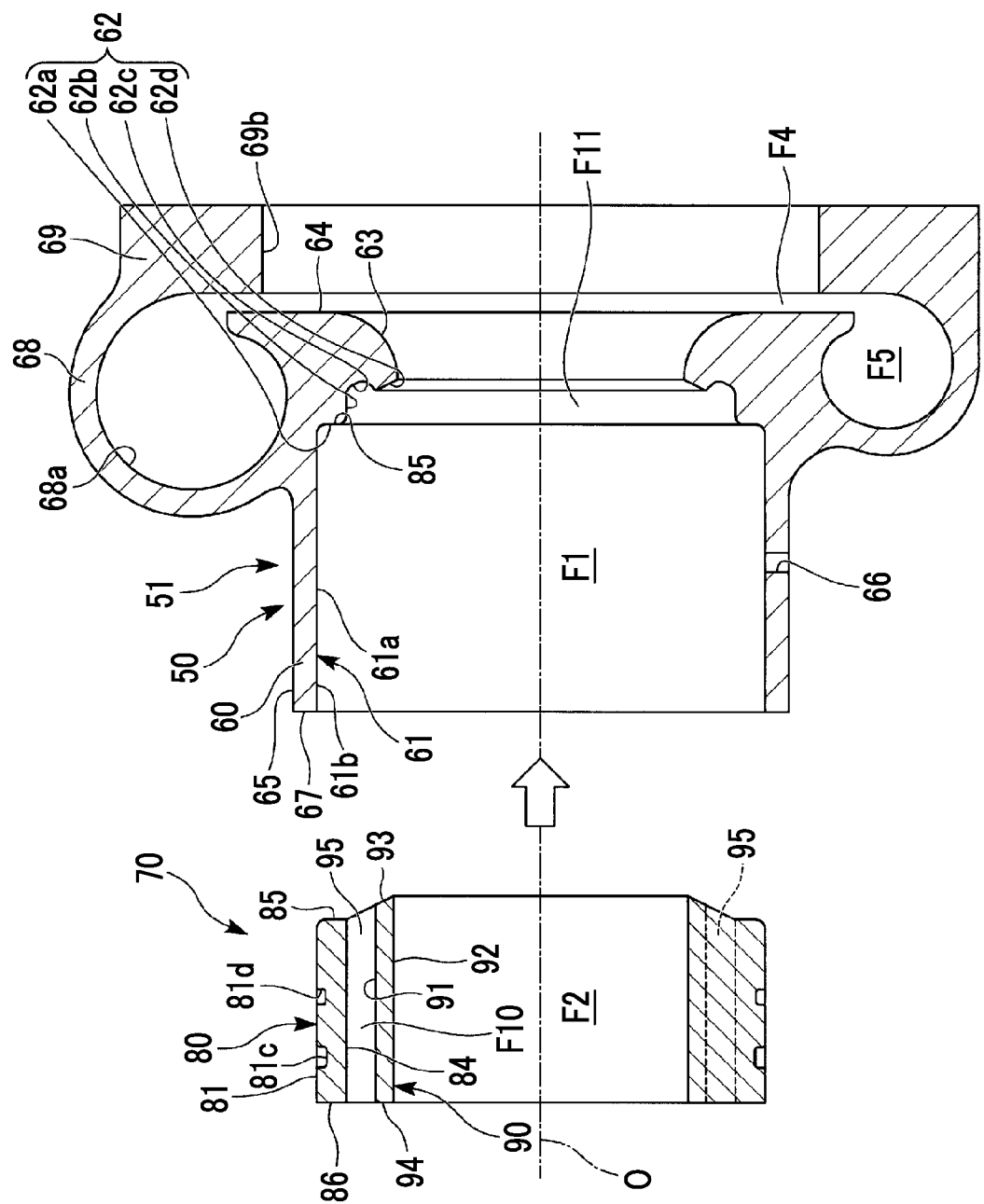
FIG. 4 is a longitudinal sectional view illustrating a state where the compressor cover related to the embodiment of the invention is disassembled into a cover body 51 and a sleeve.

Then, in the insertion step S3, as illustrated in FIG. 4, the sleeve 70 is fitted into the cover body 51 by inserting the sleeve 70 into the inside of the tubular part 60 of the cover body 51 from the upstream side in the direction of the axis O in a state where the sleeve 70 and the cover body 51 are coaxially disposed. In this case, for example, cold fitting in which fitting is performed by cooling the sleeve 70 to reduce the diameter of the sleeve 70, or shrinkage fitting in which fitting is performing by heating the cover body 51 to expand the diameter of the tubular inner peripheral surface 61 may be adopted.

In the insertion step S3, the sleeve 70 is inserted until the outer tube downstream end surface 85 of the sleeve 70 abuts against the abutting surface 62a of the stepped part 62 of the cover body 51. The slit F11 is formed between the inner tube downstream end surface 93 and the slit-forming surface 62d of the stepped part 62 by the abutment of the outer tube downstream end surface 85 against the abutting surface 62a. The compressor cover 50 in which the cover body 51 and the sleeve 70 are integrated is completed by such a step.

Next, the operation of the centrifugal compressor 40 and the turbocharger 1 including the compressor cover 50 having the above configuration will be described.

If the flue gas discharged from, for example, an engine is supplied to the radial turbine 30 from the radially outer side, the radial turbine 30 rotates and the flue gas is discharged in the direction of the axis O. The rotation of the radial turbine 30 is transmitted to the delivery fan 41 of the centrifugal compressor 40 via the rotor 15, and the delivery fan 41 rotates around the axis O. Then, the delivery fan 41 sucks in air from the upstream side in the direction of the axis O, and discharges this air to the radially outer side. That is, air is compressed in a process in which the air flows through upstream suction flow path F1, the downstream suction flow path F2, and the diameter-expanded flow path F3, and is discharged to the diffuser flow path F4. Then, the air that has flowed through the diffuser flow path F4 flows through the inside of the scroll flow path F5 in the peripheral direction, and is finally discharged from the outlet part 68b of the scroll part 68 to the outside. Such compressed air is sent into an engine combustion chamber and is provided for combustion.

In the centrifugal compressor 40 of the present embodiment, the recirculation flow path F10 is formed in the sleeve 70 fitted into the cover body 51. Consequently, a portion of the air that flows through the delivery fan 41 is introduced as a swirling flow within the recirculation flow path F10 by moving to the radially outer side via the slit F11. In this way, after the swirling flow introduced into the recirculation flow path F10 flows through the recirculation flow path F10 toward a reverse direction of a main flow, that is, along the struts 95 toward the upstream side in the direction of the axis O, the swirl flow is made to flow back into the upstream suction flow path F1. In this way, when a portion of the air flowing through the delivery fan 41 is made to flow back continuously, the flow of the air that flows through the main flow and the recirculation flow path F10 are formed. Then, since an apparent suction flow rate into the delivery fan 41 increases, the operational state of the centrifugal compressor 40 is kept away from a surging region. Accordingly, the operating range of the centrifugal compressor 40 can be expanded, and occurrence of surging when the flow rate of the air to be supplied from the outside to the centrifugal compressor 40 has decreased can be suppressed.

Here, in the compressor cover 50 of the present embodiment, the sleeve 70 has the outer tube 80, the inner tube 90, and the struts 95, and the outer tube 80 is fitted to the tubular inner peripheral surface 61 of the cover body 51. Therefore, a gap is not generated between the plurality of sections of the recirculation flow path F10. That is, since the outer tube 80, the inner tube 90, and the struts 95 are integrally molded and relative positional relationships among the outer tube 80, the inner tube 90, and the struts 95 are uniquely determined, generation of an unintended gap between the outer tube 80 and the struts 95 or between the inner tube 90 and the struts 95 can be avoided.

Consequently, the air guided to the recirculation flow path F10 within the sleeve 70 via the slit F11 is guided to the upstream suction flow path F1, while being straightened by the struts 95. Accordingly, since a flow as aimed at the beginning can be formed within the recirculation flow path F10, it is possible to avoid degradation of performance resulting from generation of an unintended flow within the recirculation flow path F10.

Moreover, in the present embodiment, the outer peripheral surface 81 of the outer tube 80 is fitted to the tubular inner peripheral surface 61. Therefore, it is not necessary to separately provide a member for fixing the sleeve 70 to the cover body 51. Therefore, part costs and the number of assembling steps can be reduced.

Additionally, the whole region of the recirculation flow path F10 in the direction of the axis O is defined by the outer tube 80 and the inner tube 90, leak-out of the fluid between the sections of the recirculation flow path F10 over a wide range in the direction of the axis O can be avoided. This makes it possible to provide the struts 95 with a higher straightening effect.

Moreover, since the sleeve 70 is formed in the whole region of the recirculation flow path F10, a high-rigidity sleeve 70 can be realized, resonance of the sleeve 70 resulting from the fluid flowing through the inside of the centrifugal compressor 40 or the rotation of the delivery fan 41 can be avoided.

Additionally, in the present embodiment, the slit F11 allows the recirculation flow path F10 and the main flow path to communicate with each other between the inner tube downstream end surface 93 of the sleeve 70 fitted into the cover body 51 and the slit-forming surface 62d of the stepped part 62 of the cover body 51 is defined. Therefore, it is not necessary to separately form a hole equivalent to the slit F11, in the sleeve 70 or the cover body 51. That is, in a case where an attempt to form the hole in a sleeve 70 or the cover body 51 is made, there is a concern that a manufacture process may become complicated as much as separate processing steps are increased. Additionally, even if an attempt to mold the sleeve 70 or the cover body 51 through injection molding or casting is made, work becomes complicated as much as the shape of a mold or a core become complicated. In contrast, in the present embodiment, the slit F11 is formed only depending on the relative positional relationship between the cover body 51 and the sleeve 70. Therefore the above drawback can be solved.

Additionally, when the sleeve 70 is inserted and fitted into the cover body 51, the above slit F11 is uniquely defined by the outer tube downstream end surface 85 of the outer tube 80 of the sleeve 70 abutting against the abutting surface 62*a* of the stepped part 62 of the cover body 51. That is, it is not necessary to separately perform the work of adjusting the spacing of the sleeve 70 in the direction of the axis O as a result of the sleeve 70 and the cover body 51 being positioned by the abutment between the outer tube downstream end surface 85 and the abutting surface 62*a*. Therefore, the slit F11 with the spacing as intended at the beginning can be easily formed.

Here, in the centrifugal compressor 40, the temperature of air rises if the air is compressed by the delivery fan 41. Therefore, generally, the downstream side in the direction of the axis O is apt to have a higher temperature. In the present embodiment, the fitting degree of the upstream region 81*a* of the sleeve 70 that is not easily influenced by the high temperature is set to a large value. Therefore, adverse effects, such as loosening resulting from the high temperature, do not occur in the fitting of the upstream region 81*a*. Consequently, even during the operation of the centrifugal compressor 40, the integration between the compressor cover 50 and the sleeve 70 can be firmly maintained. Additionally, the fitting degree of the downstream region 81*b* of the sleeve 70 that is easily influenced by the high temperature is set to a small value. Therefore, generation of a thermal stress resulting from thermal elongation in the downstream region 81*b* can be suppressed. Accordingly, the durability of the cover body 51 and the sleeve 70 can be improved, and the lifespan of the compressor cover 50 can be prolonged.

In addition, in the centrifugal compressor 40, particularly the inside of the scroll flow path F5 through which the air after compression flows reaches a high temperature. However, in the present embodiment, the position, in the direction of the axis O, of the boundary between the upstream region 81*a* and the downstream region 81*b* of the outer peripheral surface 81 of the outer tube is disposed to avoid the scroll flow path F5. Therefore, durability can be further improved while further solidifying the integration between the compressor cover 50 and the sleeve 70.

Additionally, in the present embodiment, the O ring 83 can be disposed between the outer tube 80 and the cover body 51, that is, between the sleeve 70 and the cover body 51 because of a configuration in which the outer tube 80 of the sleeve 70 is fitted into the tubular inner peripheral surface 61 of the cover body 51. That is, because of the configuration in which a gap and a fitting part formed by the outer tube 80 and the cover body 51 of the sleeve 70 are circularly formed, the O ring can be disposed in the gap and the fitting part. Accordingly, since an air flow being crowded between the cover body 51 and a sleeve 70 can be more reliably avoided, this leads to suppressing generation of an unintended flow, and the entire performance of the centrifugal compressor 40 can be kept high.

Here, if the compressor cover 50 is integrally manufactured by total cutting without being divided into the cover body 51 and a sleeve 70 temporarily, time and efforts are required and cost becomes excessive, as much as requiring to cut and form a complicated-shaped recirculation flow path F10. In contrast, in the present embodiment, the compressor cover 50 is divided into the cover body 51 and the sleeve 70 and these cover body and sleeve are separately molded, the cover body 51 and the sleeve 70 can be molded by a molding method suitable for each of the cover body 51 and the sleeve 70. Also, since the cover body 51 and sleeve 70 that are separately molded in this way are integrated by fitting the sleeve 70 into the cover body 51, the compressor cover 50 can be easily manufactured.

Particularly, the cost of the overall manufacture process can be reduced by molding the cover body 51 by the sandcast suitable for the mass production of large-sized products, and molding the sleeve 70 by injection molding or lost wax molding suitable for molding of relatively small-sized and precise products.

Additionally, the sleeve 70 that has a complicated shape compared with the cover body 51 can be molded with high precision. Consequently, particularly compared with a case where the sleeve 70 is molded by the sandcast, the width of the struts 95 in the peripheral direction can be made smaller, and the number of struts can be increased. Since the straightening effect of the swirling flow that enters the recirculation flow path F10 can be improved as the width of the struts 95 in the peripheral direction are smaller and the number of struts 95 is greater, the compressor cover 50 with higher performance can be realized.

Meanwhile, if the sleeve 70 is molded by the sandcast, the mechanical characteristics of the molded sleeve 70 deteriorate because the heat of a core when being cast in is hard to escape. In the present embodiment, the disadvantages can also be solved by molding the sleeve 70 by injection molding or lost wax molding.

Although the embodiment of the invention has been described above, the invention is not limited to this, and can be appropriately changed without departing from the technical idea of the invention. For example, in the embodiment, the outer peripheral surface 81 of the outer tube 80 of the sleeve 70 is configured to be fitted to the tubular inner peripheral surface 61 of the cover body 51. However, the invention is not limited to this. Instead of this, the sleeve 70 may be made insertable into the cover body 51 so that a gap is formed between the tubular inner peripheral surface 61 and the outer peripheral surface 81 of the outer tube 80 of the sleeve 70. In this case, the sleeve 70 is fixed to the cover body 51 by a fixing member that is separately provided. That is, the sleeve 70 may be fixed to the cover body 51, and the cover body 51, and the sleeve 70 may be integrated together not only using fitting but also every well-known means.

As the above fixing member, for example, a spacer interposed between the tubular inner peripheral surface 61 and the outer peripheral surface 81 of the outer tube 80 can also be used, or a bolt that fixes the cover body 51 and the sleeve 70 to each other can also be used.

In addition, even in a case where both of the upstream region 81*a* and the downstream region 81*b* in the outer peripheral surface 81 of the outer tube 80 are clearance-fitted to the tubular inner peripheral surface 61, if the outer tube 80 is fixed to the cover body 51 by the fixing member, the outer tubes 80 and the cover body 51 can be can be integrated with each other.

In this way, if the outer tube 80 is fixed to the tubular inner peripheral surface 61 of the cover body 51, similar to the embodiment, it is possible to prevent or reduce a situation in which a gap is generated between the plurality of sections of the recirculation flow path. Consequently, leak-out of the fluid between the sections of the recirculation flow path F10 can be avoided, and generation of an unintended flow between the cover body 51 and the sleeve 70 can be suppressed.

Figure 7:
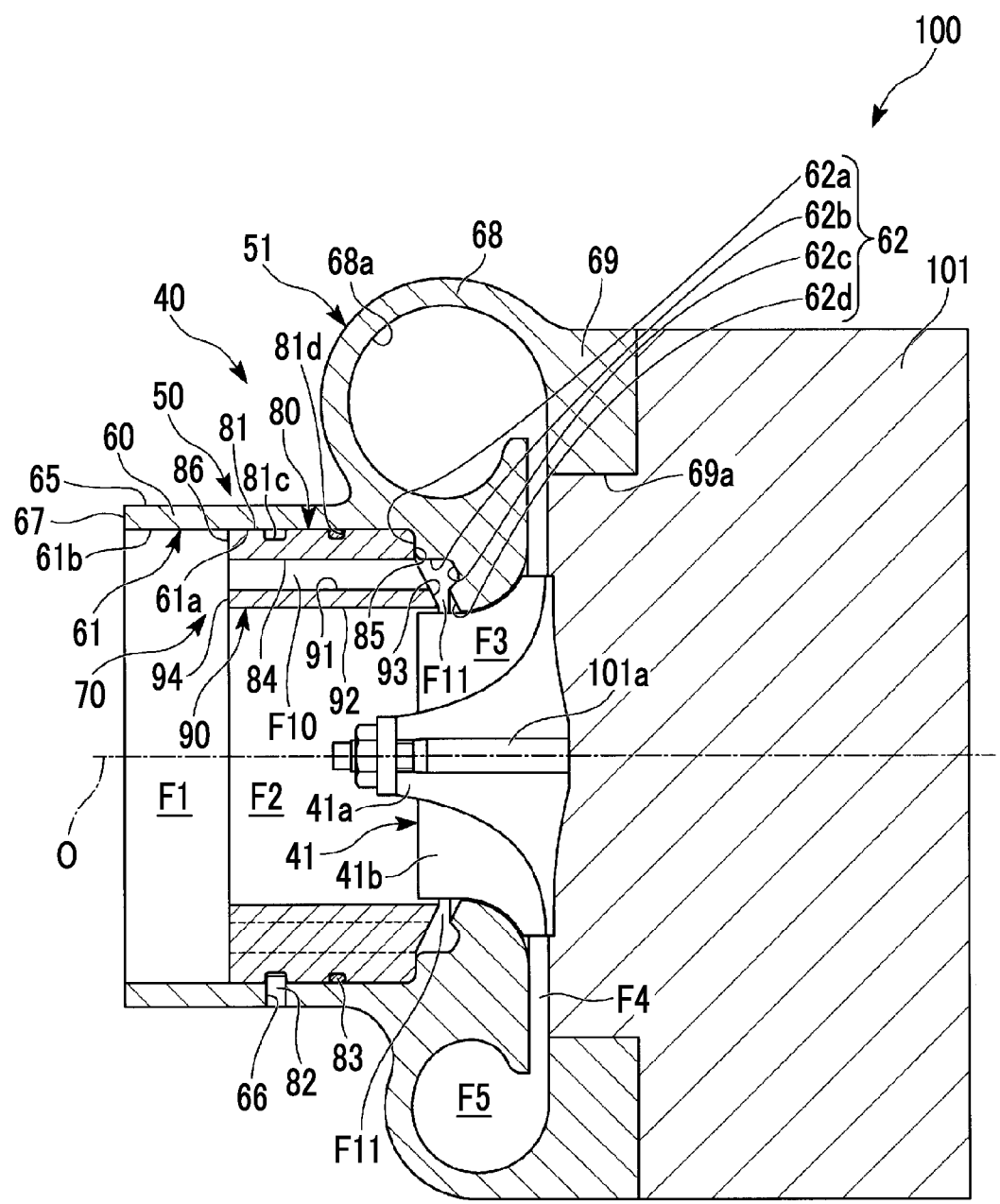
FIG. 7 is a longitudinal sectional view of the turbocharger illustrating a first modification example of the embodiment of the invention.

Additionally, as a turbocharger 100 of a first modification example of the embodiment, as illustrated in FIG. 7, a configuration using the electric motor 101 may be used as the drive unit. This first modification example includes a centrifugal compressor 40 and an electric motor 101 with the same configuration as the embodiment. The electric motor 101 has an output shaft 101a that is rotated around the axis O by the supply of electric driving power from a driving power source (not illustrated), and the delivery fan 41 is integrally attached to output shaft 101a so as to be rotatable around the axis O together with the output shaft 101a.

Figure 8:
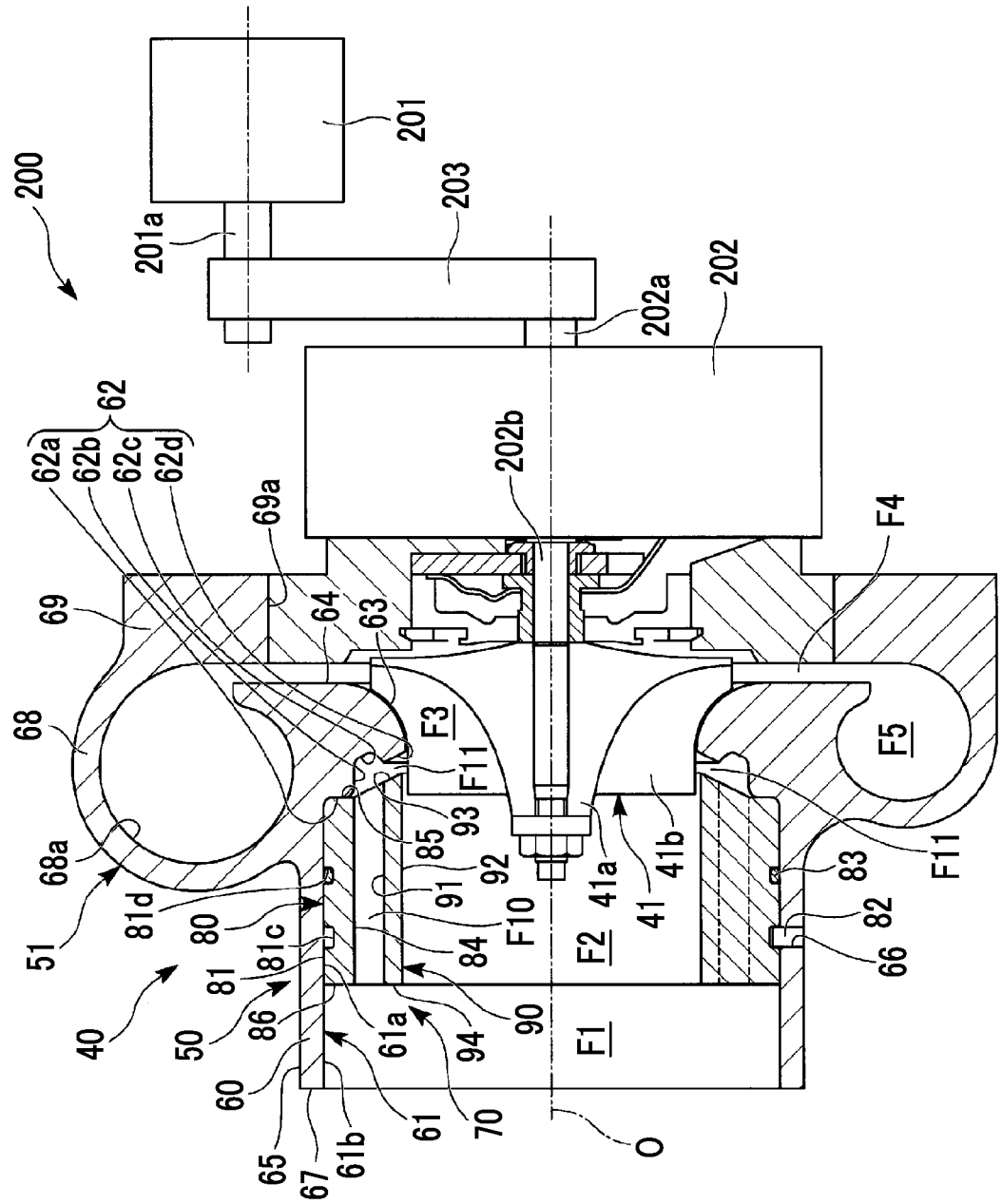
FIG. 8 is a longitudinal sectional view of the turbocharger illustrating a second modification example of the embodiment of the invention.

Additionally, as a turbocharger 200 of a second modification example of the embodiment, as illustrated in FIG. 8, a configuration may be adopted in which a prime mover 201 is included as the drive unit and the output of the prime mover 201 is transmitted to the delivery fan 41 of the centrifugal compressor 40 via a driving belt 203 and a transmission 202. In this configuration, an output shaft 201a of the prime mover 201 and an input shaft 202a of the transmission 202 are hung around the belt 203, and rotation of the output shaft 201a of the prime mover 201 is transmitted to an input shaft 202a of the transmission 202 via the belt 203. The transmission 202 changes gear on the basis of arbitrary gear ratios, and outputs the rotation of the input shaft 202a as the rotation of the output shaft 202b. The delivery fan 41 integrally fixed to the output shaft 202b of the transmission 202 rotates with the rotation of the output shaft 202b of the transmission 202.

Even if the configuration of the drive unit is a configuration different from that of the embodiment as in the first modification example and the second modification example, the same effects as the embodiment are exhibited when the centrifugal compressor 40 includes the above compressor cover 50.

Additionally, in the embodiment, the first modification example, and the second modification example, an example in which the centrifugal compressor 40 is applied to the turbocharger 1 has been described. However, the invention is not limited to this, and the invention is applicable to arbitrary rotating machines to which the centrifugal compressor 40 is applicable.

Moreover, in the embodiment, the tubular inner peripheral surface 61, and the outer peripheral surface 81 of the outer tube 80 have respectively been described as the tubular surfaces parallel to the axis O. However, for example, the tubular inner peripheral surface 61, and the outer peripheral surface 81 of the outer tube 80 may be formed as tapered surface shapes that reduce in diameter as they become closer to the downstream side in the direction of the axis O. That is, if the sleeve 70 is insertable into the cover body 51 and the sleeve 70 is fixable to the cover body 51, the shapes of the tubular inner peripheral surface 61 and the outer peripheral surface 81 of the outer tube 80 are not limited to the configurations of the embodiment.

Additionally, in the embodiment, the upstream region 81a and the downstream region 81b of the outer peripheral surface 81 of the sleeve 70 are different from each other in external diameter. Accordingly, the fitting degree of the upstream region 81a is made greater than that of the downstream region 81b. For example, the internal diameter of the tubular inner peripheral surface 61 of the cover body 51 is different in part. Accordingly, the fitting degree of the upstream region 81a may be set to be greater than that of the downstream region 81b. That is, the region corresponding to the upstream region 81a in the tubular inner peripheral surface 61 is made to have a smaller internal diameter than the region corresponding to the downstream region 81b in the tubular inner peripheral surface 61. Accordingly, the upstream region 81a may be set to have a greater fitting degree with respect to the tubular inner peripheral surface 61 than the downstream region 81b.

Moreover, the external diameters of the upstream region 81a and the downstream region 81b are different from each other and the internal diameter of the tubular inner peripheral surface 61 is different in part. Accordingly, the upstream region 81a may be set to have a greater fitting degree with respect to the tubular inner peripheral surface 61 than the downstream region 81b.

Moreover, both of the first recessed groove 81c and the second recessed groove 81d may be formed on the upstream side in the direction of the axis O, and the order thereof does not matter. Additionally, at least one of the first recessed groove 81c and the second recessed groove 81d may be formed in the downstream region 81b of the outer peripheral surface 81 of the outer tube 80.

Additionally, in the embodiment, a case where the struts 95 extend parallel to the axis O has been described. However, for example, the struts 95 may have a shape that is twisted so as to extend in the peripheral direction as they become closer to the upstream side in the direction of the axis O. Even in such complicated-shaped struts 95, in the present embodiment, the sleeve 70 is separately molded by injection molding or lost wax casting. Therefore, a desired shape can be easily formed.

Moreover, in the embodiment, the slit F11 is defined between the inner tube downstream end surface 93 of the sleeve 70 and the slit-forming surface 62d of the cover body 51. However, for example, a configuration in which a hole passing through the inside and outside of the inner tube 90 is formed and a swirling flow is guided within the recirculation flow path F10 via the hole may be adopted.

REFERENCE SIGNS LIST

1: TURBOCHARGER
10: TURBOCHARGER BODY
15: ROTOR
16: ROTOR BODY
17: FIRST THRUST COLLAR
17a: FLANGE
18: SECOND THRUST COLLAR
18a: FLANGE
19: BEARING HOUSING
19a: ANNULAR END SURFACE
19b: COUPLING OUTER PERIPHERAL PART
20: JOURNAL BEARING
25: THRUST BEARING
30: RADIAL TURBINE
40: CENTRIFUGAL COMPRESSOR
41: DELIVERY FAN
41a: BOSS PART
41b: VANE
50: COMPRESSOR COVER
51: COVER BODY
60: TUBULAR PART
61: TUBULAR INNER PERIPHERAL SURFACE
61a: FITTING REGION
61b: NON-FITTING REGION
62: STEPPED PART
62a: ABUTTING SURFACE
62b: STEPPED PART TUBULAR SURFACE
62c: CURVED SURFACE
62d: SLIT-FORMING SURFACE
63: SHROUD SURFACE
64: DIFFUSER-FORMING SURFACE
65: OUTER PERIPHERAL SURFACE

66: BOLT INSERTION HOLE
67: TUBULAR PART INLET END SURFACE
68: SCROLL PART
68a: SCROLL-FORMING SURFACE
68b: OUTLET PART
69: COUPLING PART
69a: COUPLING INNER PERIPHERAL PART
70: SLEEVE
80: OUTER TUBE
81: OUTER PERIPHERAL SURFACE
81a: UPSTREAM REGION
81b: DOWNSTREAM REGION
81c: FIRST RECESSED GROOVE
81d: SECOND RECESSED GROOVE
82: RETAINING BOLT
83: O RING
84: INNER PERIPHERAL SURFACE
85: OUTER TUBE DOWNSTREAM END SURFACE
86: OUTER TUBE UPSTREAM END SURFACE
90: INNER TUBE
91: OUTER PERIPHERAL SURFACE
92: INNER PERIPHERAL SURFACE
93: INNER TUBE DOWNSTREAM END SURFACE
94: INNER TUBE UPSTREAM END SURFACE
95: STRUT
100: TURBOCHARGER
101: ELECTRIC MOTOR
101a: OUTPUT SHAFT
200: TURBOCHARGER
201: PRIME MOVER
201a: OUTPUT SHAFT
202: TRANSMISSION
202a: INPUT SHAFT
202b: OUTPUT SHAFT
203: BELT
F1: UPSTREAM SUCTION FLOW PATH
F2: DOWNSTREAM SUCTION FLOW PATH
F3: DIAMETER-EXPANDED FLOW PATH
F4: DIFFUSER FLOW PATH
F5: SCROLL FLOW PATH
F10: RECIRCULATION FLOW PATH
F11: SLIT
S1: COVER BODY MOLDING STEP
S2: SLEEVE MOLDING STEP
S3: INSERTION STEP

The invention claimed is:

1. A compressor cover that covers a delivery fan which discharges, to a radial outer side, a fluid sucked in from a direction of an axis by rotating around the axis, the compressor cover comprising:
   a cover body that includes a tubular part in which a tubular inner peripheral surface along the axis and a shroud surface that is disposed on a downstream side of the tubular inner peripheral surface in the direction of the axis and expands in diameter toward the downstream side in the direction of the axis are formed; and
   a sleeve that includes an outer tube having an outer peripheral surface that is fitted to the tubular inner peripheral surface, an inner tube that is disposed on a radially inner side of the outer tube and defines a recirculation flow path, through which a portion of the fluid that is sucked in by the delivery fan flows, between the inner tube and the outer tube, and a plurality of struts that are disposed at intervals in a peripheral direction so as to connect the outer tube and the inner tube together, thereby partitioning the recirculation flow path into a plurality of sections, wherein
   the outer peripheral surface of the outer tube includes an upstream region, and a downstream region that is continuous with a downstream side of the upstream region in the direction of the axis,
   an external diameter of the upstream region is greater than an external diameter of the downstream region, and
   the upstream region has a greater fitting degree with respect to the tubular inner peripheral surface than the downstream region.

2. The compressor cover according to claim 1,
   wherein the recirculation flow path extends in a direction along the axis, and a whole region of the recirculation flow path in the direction of the axis is defined by the outer tube and the inner tube of the sleeve.

3. The compressor cover according to claim 2,
   wherein the tubular part includes a stepped part that extends from an end part of the tubular inner peripheral surface on the downstream side in the direction of the axis toward a radially inner side and is connected to an end part of the shroud surface on an upstream side in the direction of the axis, and
   wherein a slit that allows the recirculation flow path to communicate with the radially inner side is defined by the stepped part and the end part of the inner tube on the downstream side.

4. The compressor cover according to claim 1,
   wherein the tubular part includes a stepped part that extends from an end part of the tubular inner peripheral surface on the downstream side in the direction of the axis toward a radially inner side and is connected to an end part of the shroud surface on an upstream side in the direction of the axis, and
   wherein a slit that allows the recirculation flow path to communicate with the radially inner side is defined by the stepped part and the end part of the inner tube on the downstream side.

5. The compressor cover according to claim 4,
   wherein an end part of the outer tube on the downstream side abuts against the stepped part.

6. The compressor cover according to claim 1,
   wherein the upstream region has the greater fitting degree with respect to the tubular inner peripheral surface than the downstream region due to an internal diameter of a region of the tubular inner peripheral surface corresponding to the upstream region being smaller than that of a region of the tubular inner peripheral surface corresponding to the downstream region.

7. The compressor cover according to claim 1,
   wherein the cover body further includes a scroll part, which extends in a peripheral direction and forms a scroll flow path into which a fluid discharged from the delivery fan is introduced, on an outer peripheral side of the tubular part, and
   wherein a boundary between the upstream region and the downstream region is located at the same position in the direction of the axis as an end part of the scroll flow path on the upstream side in the direction of the axis or located closer to the upstream side in the direction of the axis than the position, in the direction of the axis, of the end part of the scroll flow path on the upstream side in the direction of the axis.

8. The compressor cover according to claim 1, further comprising:
   an O ring that is interposed between the tubular inner peripheral surface and the outer peripheral surface of the outer tube.

9. A centrifugal compressor comprising:
the compressor cover according to claim 1; and
the delivery fan covered with the compressor cover.

10. A turbocharger comprising:
the centrifugal compressor according to claim 9; and
a drive unit that rotates the delivery fan of the centrifugal compressor around the axis.

11. The compressor cover according to claim 1,
wherein the upstream region of the outer peripheral surface of the outer tube is interference-fitted to the tubular inner peripheral surface and the downstream region of the outer peripheral surface of the outer tube is clearance-fitted to the tubular inner peripheral surface.

12. The compressor cover according to claim 1,
wherein an upstream end surface of the outer tube and an upstream end surface of the inner tube are formed flat shapes orthogonal to the axis and positioned at the same with each other in the direction of the axis,
the upstream end surface of the outer tube and the upstream end surface of the inner tube are positioned at downstream side than an upstream end of the cover body, and
an upstream end of the recirculation flow path is opened toward the upstream side in the direction of the axis.

13. A compressor cover manufacturing method for manufacturing a compressor cover that covers a delivery fan which discharges, to a radial outer side, a fluid sucked in from a direction of an axis by rotating around the axis, the method comprising:
a step of forming a cover body that includes a tubular part in which a tubular inner peripheral surface along the axis and a shroud surface that is disposed on a downstream side of the tubular inner peripheral surface in the direction of the axis and expands in diameter toward the downstream side are formed;
a step of molding a sleeve that includes an outer tube having an outer peripheral surface that is fitted to the tubular inner peripheral surface, an inner tube that is disposed on a radially inner side of the outer tube and defines a recirculation flow path, through which a portion of the fluid that is sucked in by the delivery fan flows, between the inner tube and the outer tube, and a plurality of struts that are disposed at intervals in a peripheral direction so as to connect the outer tube and the inner tube together, thereby partitioning the recirculation flow path into a plurality of sections; and
a step of inserting the sleeve from the upstream side of the tubular part in the direction of the axis such that an outer peripheral surface of the outer tube is fixed to the tubular inner peripheral surface, wherein
the outer peripheral surface of the outer tube includes an upstream region and the downstream region that is continuous with a downstream side of the upstream region in the direction of the axis,
an external diameter of the upstream region is greater than an external diameter of the downstream region;
the step of inserting the sleeve is a step of inserting the sleeve such that the outer peripheral surface of the outer tube is fitted to the tubular inner peripheral surface, and the upstream region has a greater fitting degree with respect to the tubular inner peripheral surface than the downstream region.

14. The compressor cover manufacturing method according to claim 13,
wherein the step of molding the sleeve is a step of integrally molding the sleeve by injection molding or lost wax casting.

* * * * *